United States Patent
Yoakum et al.

(10) Patent No.: US 6,421,674 B1
(45) Date of Patent: Jul. 16, 2002

(54) METHODS AND SYSTEMS FOR IMPLEMENTING A REAL-TIME, DISTRIBUTED, HIERARCHICAL DATABASE USING A PROXIABLE PROTOCOL

(75) Inventors: John H. Yoakum, Cary; James E. Reaves; Paul D. Alluisi, both of Raleigh, all of NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/504,211

(22) Filed: Feb. 15, 2000

(51) Int. Cl.[7] .............................. G06F 17/30; G06F 7/00
(52) U.S. Cl. ............................................................ 707/10
(58) Field of Search ........................... 707/1–10, 514; 709/200–203, 217–226, 230, 238, 239–245, 249, 232

(56) References Cited

U.S. PATENT DOCUMENTS

| 5,625,681 | A | | 4/1997 | Butler, II .................... 379/207 |
| 6,253,326 | B1 | * | 6/2001 | Lincke et al. ............... 380/255 |
| 6,341,311 | B1 | * | 1/2002 | Smith et al. ................ 709/226 |
| 6,345,294 | B1 | * | 2/2002 | O'Toole et al. ............. 709/222 |

FOREIGN PATENT DOCUMENTS

| WO | WO 97/22211 | 6/1997 | ............ H04Q/3/00 |

OTHER PUBLICATIONS

Handley, M. et al., "RFC 2543 SIP: Session Initiation Protocol," IETF RFC, Online! Mar. 1999, XP002173547, http://www.ietf.org/rfc/rfc2543.txt.
Handley Et Al., "SIP: Session Initiation Protocol," Network Working Group, Request for Comments: 2543, pp. 1–111, (Mar., 1999).
Handley Et Al., "SDP: Session Description Protocol," Network Working Group, Request for Comments: 2327, pp. 1–42, (Apr., 1998).

* cited by examiner

Primary Examiner—John Breene
Assistant Examiner—Linh Pham
(74) Attorney, Agent, or Firm—Withrow & Terranova, P.L.L.C.

(57) ABSTRACT

A system for implementing a real-time distributed, hierarchical database uses a proxiable protocol. The system includes a first proxy server for receiving a first proxiable protocol message from a first network element. The first proxy server performs a first database lookup based on information contained in the first message. If the first proxy server does not obtain the requested information, the first proxy server formulates a second proxiable protocol message and forwards the message to a second proxy server. A second proxy server receives the second message and performs a second database lookup based on information contained in the second message. The second proxy server sends the results from the second database lookup to the first proxy server and the first proxy server forwards the results to the database user.

23 Claims, 6 Drawing Sheets

| CALLED NUMBER | CONTACT NUMBER | ROUTING PREFIX | DEFAULT CONTACT NUMBER | ACTION CODE |
|---|---|---|---|---|
| 46705990060 | 46705990060 | 001 | 46705990060 | 1 |
| 46705990061 | 91919338000 | 001 | 91949338000 | 1 |
| 46706662326 | — | — | 46706662326 | 2 |
| ... | | | | |

*FIG. 4*

METHODS AND SYSTEMS FOR IMPLEMENTING A REAL-TIME, DISTRIBUTED, HIERARCHICAL DATABASE USING A PROXIABLE PROTOCOL

TECHNICAL FIELD

The present invention relates to methods and systems for implementing a real-time, distributed, hierarchical database. More particularly, the present invention relates to methods and systems for implementing a real-time, distributed, hierarchical database using a proxiable protocol.

FIELD OF THE INVENTION

Classical high performance telephony data structures, such as home location registers (HLRs), number portability databases, visitor location registers (VLRs), and other subscriber-services-related data structures require reliable, real-time access databases. Existing data structures rely on large centralized databases implemented in fault-tolerant computing platforms. Implementing large data structures results in costly, inflexible products, and network architectures.

FIG. 1 illustrates a conventional centralized database architecture. In FIG. 1, a subscriber might desire to make a call to another subscriber whose number has been ported from one carrier to another carrier. When the subscriber dials the number using end user device 100, which can be a public switched telephone network (PSTN) terminal, the dialed digits are communicated to service switching point (SSP) 102. SSP 102 is a switch at the calling subscriber's end office that sets up a call with a called party through the called party's end office. SSP 102 examines the dialed digits and determines that the number has been ported. Accordingly, SSP 102 formulates a transaction capabilities application part (TCAP) query and addresses the query to service control point (SCP) 104. The TCAP query passes through signal transfer point (STP) 106, which routes the query to SCP 104. SCP 104 includes a centralized database containing contact numbers corresponding to ported numbers. SCP 104 performs a database lookup using the dialed digits and determines a contact number corresponding to the ported number. SCP 104 sends the contact number to SSP 102 through STP 106 in a TCAP response. SSP 102 then sends a call setup message to the end office corresponding to the contact number in order to establish a call.

One problem with the centralized database architecture illustrated in FIG. 1 is that the centralized database in SCP 104 is required to contain entries for all ported numbers. Large database structures cannot be economically implemented by SCP 104. For example, a database can require 20 million records for number portability or other service. In order to provide a real-time response, e.g., 5 milliseconds or less, the entire database is required to be stored in dynamic random access memory (RAM) of a central processing unit (CPU) engine. The amount of RAM required to store 20 million database records greatly increases the cost of a centralized database. For example, 1 Gigabyte of RAM can be required to store 5 million subscriber database records. Current technology only allows 1 Gigabyte of RAM to be present on a single Versa Module Europa (VME) bus board. As a result, multiple VME bus boards with multiple processors are required to implement a database of 20 million customer records. Similar memory limitations exist in other board technologies such as Compact PCI. Such memory and processing requirements are cost-prohibitive for a single SCP database. What is needed is a real-time, distributed, hierarchical database in which database records are distributed across multiple physical machines located in different locations. Such a database preferably appears as a single database to the database user so that no modifications are required to existing telephony equipment, such as end office switches and gateways that access the databases. Accordingly, there exists a need for novel methods and systems for implementing a real-time, distributed, hierarchical database in a manner that is transparent to the database user.

DESCRIPTION OF THE INVENTION

The present invention provides novel methods and systems for implementing a real-time, distributed, hierarchical database using a proxiable protocol. As used herein, the phrase "proxiable protocol" refers to any protocol used to send call signaling messages over an IP network in which one entity can act as a proxy for another entity in performing a desired function. For example, if one entity is unable to respond to a request from a telephony device, that entity can proxy the request by sending a second request to another entity that is capable of responding. The second request includes all of the information in the first request, but specifies that the response to the second request is to be sent to the first entity, rather than the original requester. When the first entity receives the response, the first entity responds to the requester as if the first entity had obtained the data. In this manner, the number of entities can be increased arbitrarily and transparently to the requester.

One example of a proxiable protocol is the session initiation protocol (SIP), as described in Internet Engineering Task Force (IETF) Request for Comments (RFC) 2543: Session Initiation Protocol, March 1999, the disclosure of which is incorporated herein by reference in its entirety. SIP is an application layer control protocol that is conventionally used to establish, modify, and terminate multimedia sessions or calls. SIP provides proxiable messages used to perform call setup, modification, and termination functions. For example, one SIP message used to perform call setup functions is the INVITE message. The INVITE message is conventionally used to invite telephony devices to participate in a media stream communication, such as a voice communication, a data communication, a video communication, or any combination thereof. The INVITE message includes a session description protocol (SDP) portion that is used by end user devices to exchange media capabilities and other information. One entity that formulates and processes INVITE messages, as well as other SIP messages, is referred to as a proxy server. As defined in the SIP protocol, a proxy server is an entity that is capable of acting as a proxy or agent for another entity. For example, a proxy server can receive a request, interpret the request, and formulate a new request on behalf of the original requester. Thus, a SIP proxy server is capable of proxying INVITE messages for entities, such as SIP clients and other proxy servers functioning as SIP clients. Each proxy server in the chain of proxy servers includes its own via header in the INVITE message. The via headers specify a return path for the response that is the same as the request path. According to one aspect of the present invention, this proxying and return-path specifying capability of SIP is utilized in a novel way to implement a real-time, distributed, hierarchical database.

The present invention is not limited to SIP proxy servers. Any suitable proxy server that is capable of proxying requests for other entities and specifying a return path is intended to be within the scope of the invention.

Embodiments of a real-time, distributed, hierarchical database described below can be implemented in hardware, software, or a combination of hardware and software. Accordingly, it is understood that embodiments of the present invention can be implemented as computer-executable instructions embodied in a computer-readable medium for performing the steps described below for implementing a real-time, distributed, hierarchical database. Exemplary computer-readable media suitable for use with the present invention include magnetic and optical disk storage devices and electrical storage devices, such as chip memory devices.

Accordingly, it is an object of the present invention to provide novel methods and systems for implementing a real-time, distributed, hierarchical database using a proxiable protocol.

An object of the invention having been stated hereinabove and which is achieved in whole or in part by the present invention, other objects will be evident as the description proceeds, when taken in connection with the accompanying drawings as best described hereinbelow.

BRIEF DESCRIPTION OF THE DRAWINGS

A description of the embodiments of the present invention will now proceed with reference to the accompanying drawings of which:

FIG. 4 illustrates an example of a number portability database that can be included in a proxy server according to an embodiment of the present invention;

DETAILED DESCRIPTION OF THE INVENTION

Figure 1:
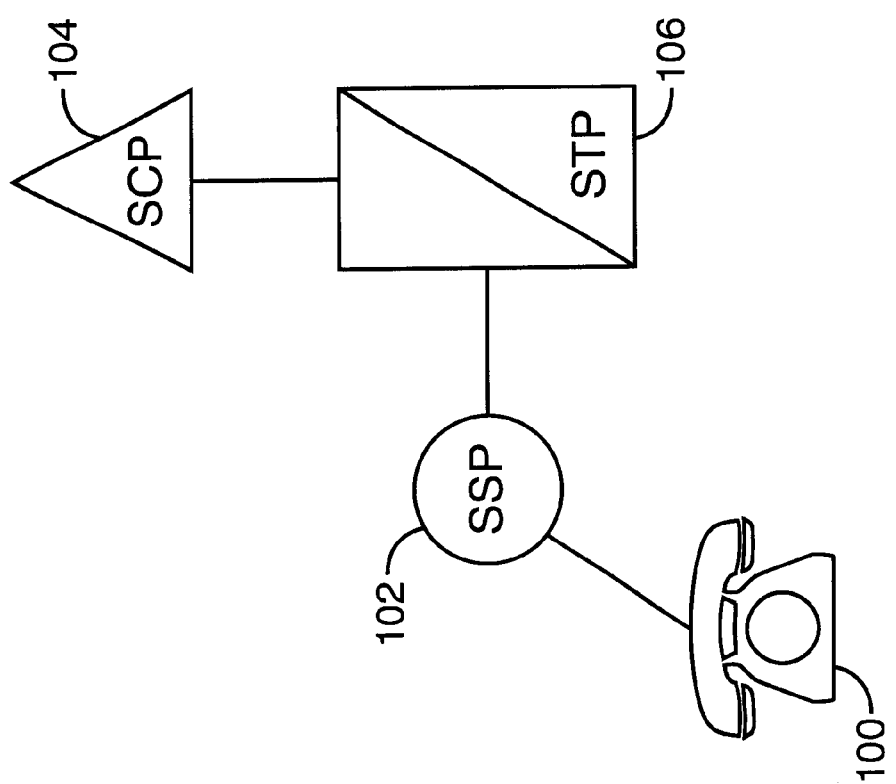
FIG. 1 is a block diagram of a conventional telephone network utilizing a centralized database.
Figure 2:
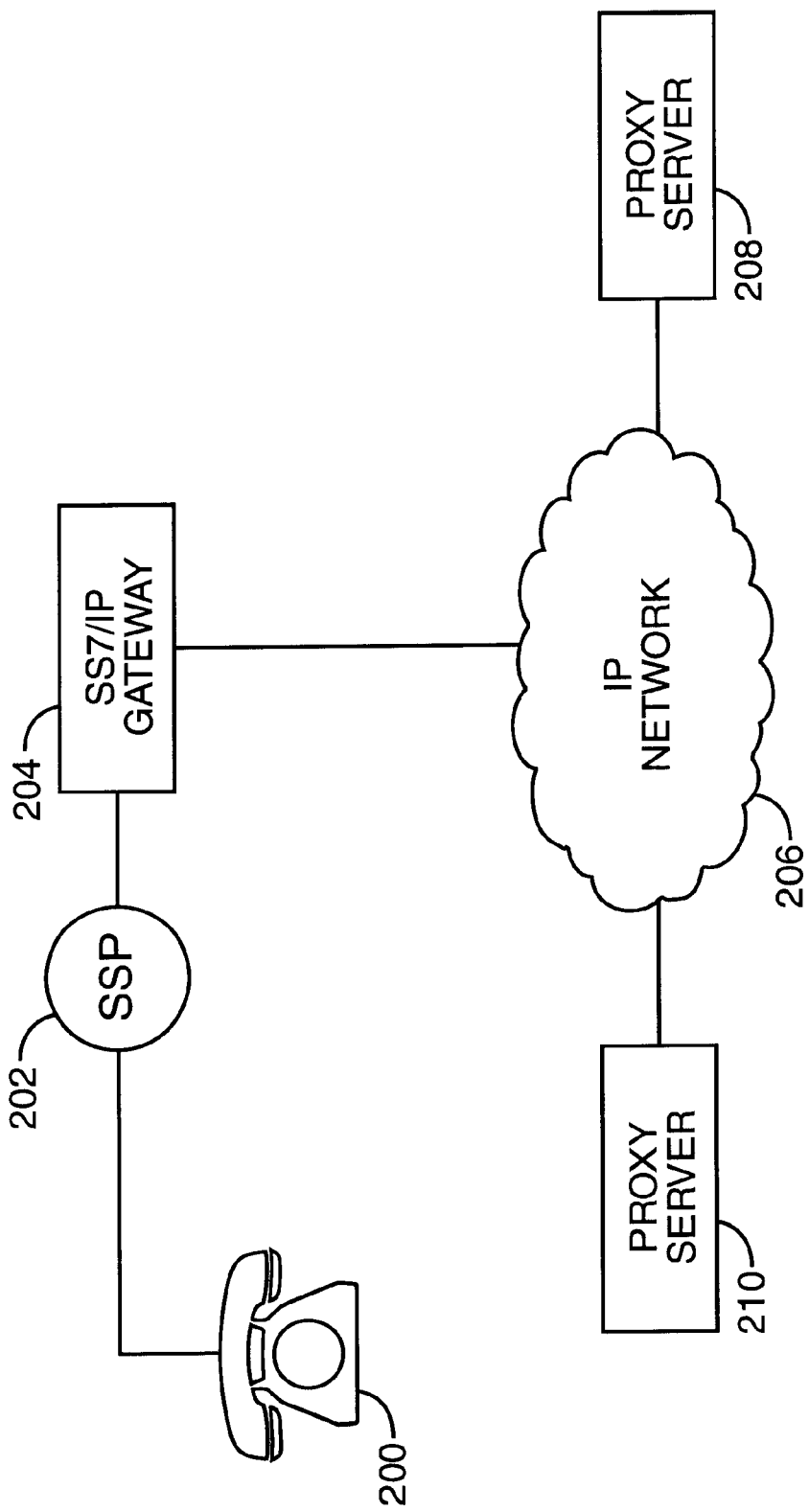
FIG. 2 is block diagram of a system for implementing a real-time, distributed, hierarchical database according to an embodiment of the present invention.

FIG. 2 illustrates a system for implementing a real-time, distributed, hierarchical database using a proxiable protocol according to an embodiment of the present invention. The entities illustrated in FIG. 2 utilize SIP messages to implement a real-time, distributed, hierarchical database. However, the present invention is not limited to using SIP messages. The use of any proxiable protocol to implement a real-time, distributed, hierarchical database is intended to be within the scope of the invention.

In FIG. 2, an end user device 200 communicates with other end user devices through service switching point (SSP) 202. End user device 200 can be any suitable end user telephony device, such as a stationary PSTN terminal or a mobile telephone handset. SSP 202 is an end office switch for setting up calls between end users.

SS7/IP gateway 204 connects SSP 202 to IP network 206. For example, SS7/IP gateway can include an SS7-compatible interface for communicating with SS7 nodes and an IP-compatible interface for communicating with IP nodes. One particular SS7 capability that gateway 204 preferably possesses is the ability to recognize TCAP queries and route the TCAP queries to a database for obtaining a TCAP response. SS7 TCAP queries can be recognized through analyzing the service information octet (SIO) field in an SS7 MSU. However, according to the present embodiment, rather than routing TCAP queries to a centralized SCP database, gateway 204 formulates a proxiable protocol message and sends that message to proxy server 208 over IP network 206.

Proxy server 208 can be a SIP proxy server that implements the first level of a database hierarchy. For example, proxy server 208 can include a database that stores records containing the requested information for some subscribers and records containing pointers to other databases for other subscribers. The database accessed by proxy server 208 can also include default response information when a lookup fails to produce a record that matches data requested in a query.

In addition, proxy server 208 can receive messages from gateway 204 and perform a first database lookup based on information contained in the first message. As used herein, the phrase "database lookup" is intended to include a lookup in a database of records stored in computer memory or equivalent logical processing where desired output information is determined from input information. If proxy server 208 has the requested information, proxy server 208 can respond to the message from gateway 204 by sending a response containing the results of the lookup to gateway 204. However, proxy server 208 might not have the requested information in its local database. In this case, results from the first database lookup can include the location of a second database where the desired information is located. Proxy server 208 then proxies the first message, formulates a second proxiable protocol message, and sends the second message to another proxy server that contains the requested information or the address of another server that includes the requested information. For example, proxy server 208 can send the second message to proxy server 210 that has access to a subscriber database (not shown) containing the requested subscriber information. In a preferred embodiment, the second message includes return route information so that proxy server 210 will return a response to proxy server 208. If proxy server 210 has the desired information, proxy server 210 responds to proxy server 208 with the desired information. Proxy server 208 sends the information to gateway 204. Gateway 204 extracts the information and communicates the information to SSP 202.

Because proxy servers according to the present embodiment are capable of proxying requests from other entities, including other proxy servers, a real-time, distributed, hierarchical database can be implemented transparently to gateway 204. In addition, the number of levels in the database can be arbitrarily increased, simply by adding additional proxy servers. The following example illustrates the use of the distributed hierarchy illustrated in FIG. 2 in responding to a number portability query from SSP 202.

Number Portability Example

Figure 3:
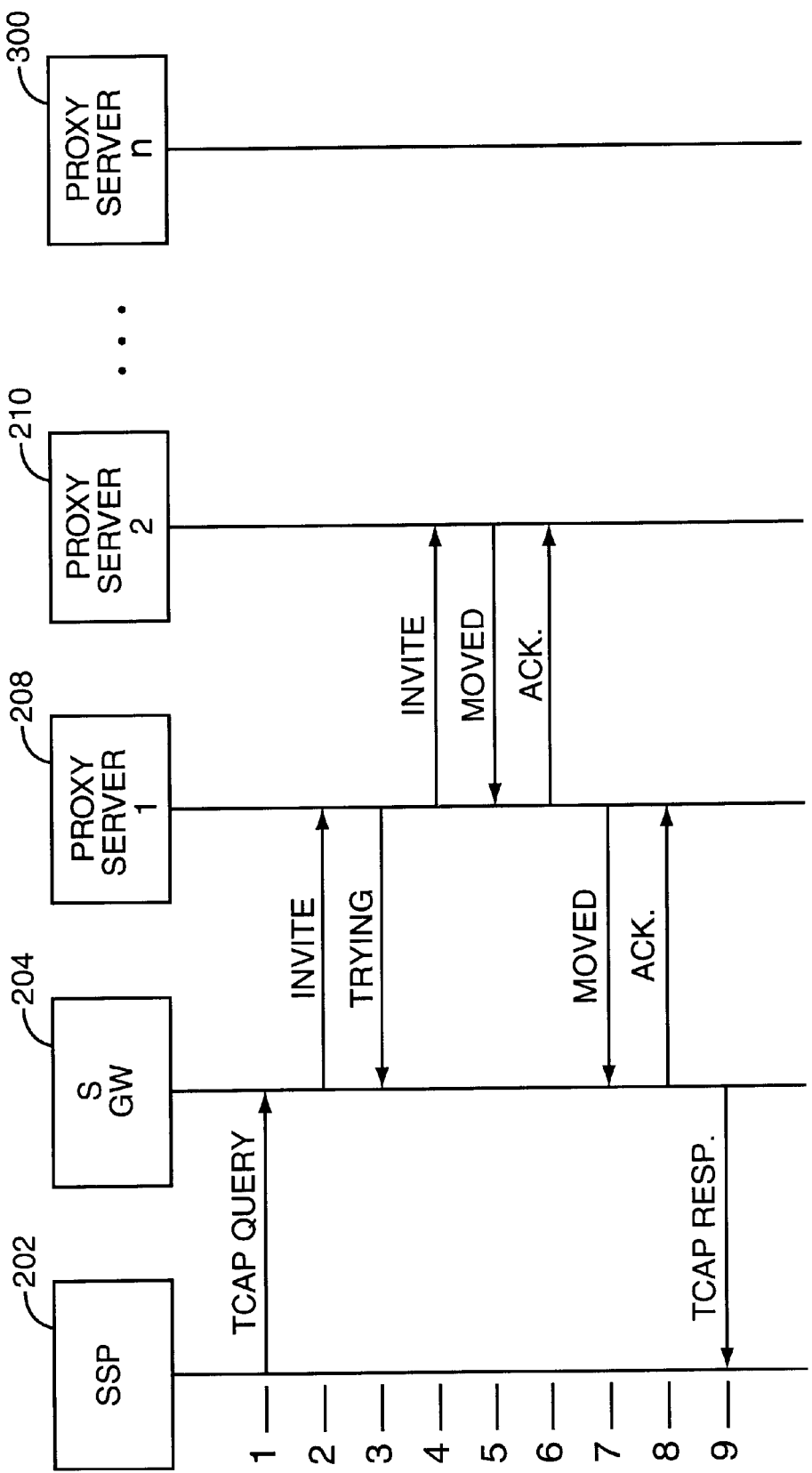
FIG. 3 is a call flow diagram illustrating the operation of a real-time, distributed, hierarchical number portability database according to an embodiment of the present invention.

FIG. 3 is a call flow diagram illustrating an exemplary message flow between an SS7/IP gateway and proxy servers implementing a real-time, distributed number portability database according to an embodiment of the present invention. In line 1 of the call flow diagram, SSP 202 transmits a TCAP query to SS7/IP gateway 204 requesting information relating to a ported number. The method for formulating a TCAP query is known to persons of ordinary skill in the telecommunications art and is not essential to explaining the present invention. Hence a detailed description of the TCAP protocol is not explained herein. What is important for purposes of explaining the present embodiment is that the TCAP query requests information regarding a ported number.

In response to receiving the TCAP query, rather than forwarding the query to a SCP, SS7/IP gateway 204 formulates an INVITE message based on information continued in the TCAP query. In line 2 of the call flow diagram, SS7/IP gateway 204 transmits an INVITE message to proxy server 208. An example of such an INVITE message is as follows:

1 INVITE
2 sip:+46706662326@47.114.177.55:50002;user= phoneSIP/.0
3 v: SIP/2.0/UDP 47.114.178.11:50001
4 t: tel:+46706662326
5 f: sip:+705990096@47.114.178.11:50001
6 i: a700ff@47.114.178.11:50001
7 CSeq: 1 INVITE In the INVITE message example, line numbers are included on the left hand side of each line in the message to facilitate a description of the fields in the message. It is understood that these line numbers are included for illustration purposes only and are not part of an actual SIP message. It is also understood that fields other than those illustrated can be included in the SIP message without departing from the scope of the invention. In line 1, "INVITE" is a method token that identifies the message as an INVITE message. In line 2, the number "4670662326" is the called party number for which a contact number is sought. Also in line 2, the number "47.114.177.55:50002" is the IP address and port number of proxy sever 208 to which the "INVITE" message is being sent. Line 3 of the SIP message is the via header. The via header identifies the return path for responding to the SIP message. In the example SIP message illustrated above, the return path is identified by the IP address and port number of signaling gateway 204 for receiving SIP messages. In the illustrated example, the IP address is 47.114.178.11 and the port number is 50001. In an alternative embodiment, the via header can contain an asynchronous transfer mode (ATM) address as the return routing information. Line 4 of the SIP message contains the "to" field, which includes the called number. Line 5 of the SIP message is the "from" field which contains the calling party number as well as the IP address and port number of signaling gateway 204 from which the SIP message originated. Line 6 of the SIP message contains a call identifier, which is used by SIP devices which is used to identify messages associated with a call. Line 7 of the SIP message contains a call sequence number which is used to identify the sequence of the message within a call.

In response to receiving the INVITE message, proxy server 208 searches at its database and determines that it does not have the data being requested. Accordingly, in line 3 of the call flow diagram, proxy server 208 formulates and sends a TRYING message to the originator of the query, i.e. to SS7/IP gateway 204. An example of such a TRYING message is as follows:

1 SIP/2.0 100 Trying
2 v: SIP/2.0/UDP 47.114.178.11:50001
3 t: tel:+46706662326
4 f: sip:+705990096@47.114.178.11:50001
5 i: a700ff@47.114.178.11:50001
6 CSeq: 1 INVITE Line 1 of the SIP message identifies the message as a TRYING message. Line 1 also contains the SIP version number. Line 2 contains the via header for the TRYING message. In the example SIP message, the via header includes the IP address and port number of proxy server 208. Line 3 of the SIP message is the "to" field, which contains the called number. Line 4 of the SIP message as the "from" field which contains the calling party number as well as the IP address and port number on signaling gateway 204 for receiving SIP messages. Line 5 of the SIP message is the call identifier, and line 6 of the SIP message is the call sequence number, as previously described.

In line 4 of the call flow diagram, proxy server 208 forwards (proxies) the INVITE message, after adding in its own via header, to proxy server 210. An example of the INVITE message that can be sent from proxy server 208 to proxy server 210 is as follows:

1 INVITE
2 sip:+46706662326@47.114.177.55:50002;user= phoneSIP/2.0
3 v: SIP/2.0/UDP 47.114.177.55:50002
4 v: SIP/2.0/UDP 47.114.178.11:50001
5 t: tel:+46706662326
6 f: sip:+705990096@47.114.178.11:50001
7 i: a700ff@47.114.178.11:50001
8 CSeq: 1 INVITE In the example INVITE message, line 1 is a header that identifies the message as being an INVITE message. The INVITE message sent from proxy server 208 to proxy server 210 is the same as the INVITE message sent from signaling gateway 204 to proxy server 208 except that proxy server 208 adds its own via header to the message. This via header is illustrated in line 3 of the example message. In line 3, the via header includes the IP address and port number of proxy server 208. This via header instructs proxy server 210 to send responses to proxy server 208.

In response to receiving the INVITE message from proxy server 208, proxy server 210 performs a database lookup in its database. If the requested data is not present, proxy server 210 can add its own via header to the INVITE message and send the INVITE message to another proxy server, such as proxy server n, illustrated in FIG. 3. Each proxy server adds its own via header to the INVITE message before forwarding the message to the next proxy server. This ensures that the response to the INVITE message travels through each proxy server that handled a request. When the original proxy server receives the response, that proxy server forwards the response to SS7/IP gateway 204. Thus, the number of proxy servers can be made arbitrarily large and the number is transparent to SS7/IP gateway 204.

In this example, it is assumed that proxy server 210 has the data requested by the original TCAP query, i.e., the routing number corresponding to the ported number. Thus, in line 5 of the call flow diagram, proxy server 210 sends a MOVED message to proxy server 208 (which is the first "via" header from the INVITE message in line 4 of the call flow diagram). An example of such a MOVED message is as follows:

1 SIP/2.0 302 Moved Temporarily
2 v: SIP/2.0/UDP 47.114.177.55:50002
3 v: SIP/2.0/UDP 47.114.178.11:50001
4 t: tel:+46706662326

5 f: sip:+705990096@47.114.178.11:50001

6 m: tel+46701234567

7 i: a700ff@47.114.178.11:50001

8 CSeq: 1 INVITE

Line 2 of the SIP message includes the via header of proxy server 208. This header contains the port number and IP address of proxy server 208 to which the MOVED message is forwarded. The contact field in line 6 of the SIP message contains the contact number obtained from the database lookup. The remaining fields in the SIP message are similar to those described with the other SIP messages described above.

In line 6 of the call flow diagram, proxy server 208 acknowledges receipt of the MOVED message. An example of such an acknowledgment is as follows:

1 ACKsip:+46706662326@47.114.177.55:50002;user=phone SIP/2.0

2 v: SIP/2.0/UDP 47.114.177.55:50002

3 v: SIP/2.0/UDP 47.114.178.11:50001

4 t: tel:+46706662326

5 f: sip:+705990096@47.114.178.11:50001

6 m: tel+46701234567

7 i: a700ff@47.114.178.11:50001

8 CSeq: 1 ACK

The fields in this SIP message are the same as those described with respect to the MOVED message above. Hence a description thereof is not repeated herein.

In line 7 of the call flow diagram, proxy server 208 removes its own "via" header and forwards the MOVED message to gateway 204. An example of such a MOVED message is as follows:

1 SIP/2.0 302 Moved Temporarily 2 v: SIP/2.0/UDP 47.114.178.11:50001

3 t: tel:+46706662326

4 f: sip:+705990096@47.114.178.11:50001

5 m: tel+46701234567

6 i: a700ff@47.114.178.11:50001

7 CSeq: 1 INVITE

The only via header remaining in the example MOVED TEMPORARILY message is the via header of signaling gateway 204. The via header of signaling gateway 204 in line 2 of the MOVED message described above has been removed. The remaining fields in the example MOVED message are the same as those described above. Hence a description thereof is not repeated herein.

In line 8 of the call flow diagram, SS7/IP gateway 204 acknowledges receipt of the MOVED message. An example of such an acknowledgment is as follows:

1 ACKsip:+46706662326@47.114.177.55:50002;user=phone SIP/2.0

2 v: SIP/2.0/UDP 47.114.178.11:50001

3 t: tel:+46706662326

4 f: sip:+705990096@47.114.178.11:50001

5 m: tel+46701234567

6 i: a700ff@47.114.178.11:50001

7 CSeq: 1 ACK

In the example ACKNOWLEDGE message, signaling gateway 204 includes its own via header to indicate that responses to the ACKNOWLEDGE message are to be sent to signaling gateway 204. This via header is illustrated in line 2 of the ACKNOWLEDGE message. The remaining fields are the same as those described above with respect to the MOVED TEMPORARILY message. Hence a description thereof is not repeated herein.

In line 9 of the call flow diagram, SS7/IP gateway 204 extracts the contact number from the MOVED message and communicates the number to SSP 202 in a TCAP response message. Because SS7/IP gateway receives the contact number in the MOVED message from proxy server 206, the number of levels in the database hierarchy is transparent to SS7/IP gateway 204.

FIG. 4 illustrates an example of a number portability database that can be accessed by a proxy server according to an embodiment of the present invention. In FIG. 4, database generally designated 400 includes a plurality of entries for records 400A–400N. Each entry includes a called number field 402 for storing a called number, a contact number field 404 for storing a contact number corresponding to the called number, a routing prefix field 406 for storing a routing prefix indicating a network associated with the ported number, a default contact number field 408 for storing default contact numbers and an action code field 410 for indicating whether to proxy or respond to a request. In entry 400A, the called number is 46705990060. The contact number field 404 also contains the number 46705990060. Because the called number and the contact number are the same, it is evident that the called number has not been ported. Default contact number field 408 in entry 400A also contains the same called number. Action code field 410 in entry 400A includes an action code of "1" which indicates that the proxy server can respond to the request.

In entry 400B, the number stored in called number field 402 is different from the contact number field 404. Hence, from this entry it is evident that the called number has been ported. Action code field 410 specifies a "1" which indicates that proxy server 208 can respond to queries containing the called number. In entry 400C, there is no contact number stored in contact number field 404. In addition, the value in action code field 410 is set to "2" indicating that proxy server 208 should proxy any queries containing the called number 46706662326. In the event that proxy server 208 does not receive a response within a predetermined time period, proxy server 208 can respond to the request with the default number 46706662326 specified in default contact number field 408. Examples where it can be desirable to provide a default contact number will be discussed in more detail below.

Generic Distributed Database

Although the example above illustrates the implementation of a real-time, distributed number portability database, the present invention is not limited to such an embodiment. For example, the methods and systems for implementing a real-time, distributed, hierarchical database can be suitably used to implement any type of database that requires high-speed access to a large number of records. Examples of types of databases that the present invention can be used to implement include home location registers, visitor location registers, etc.

Figure 5:
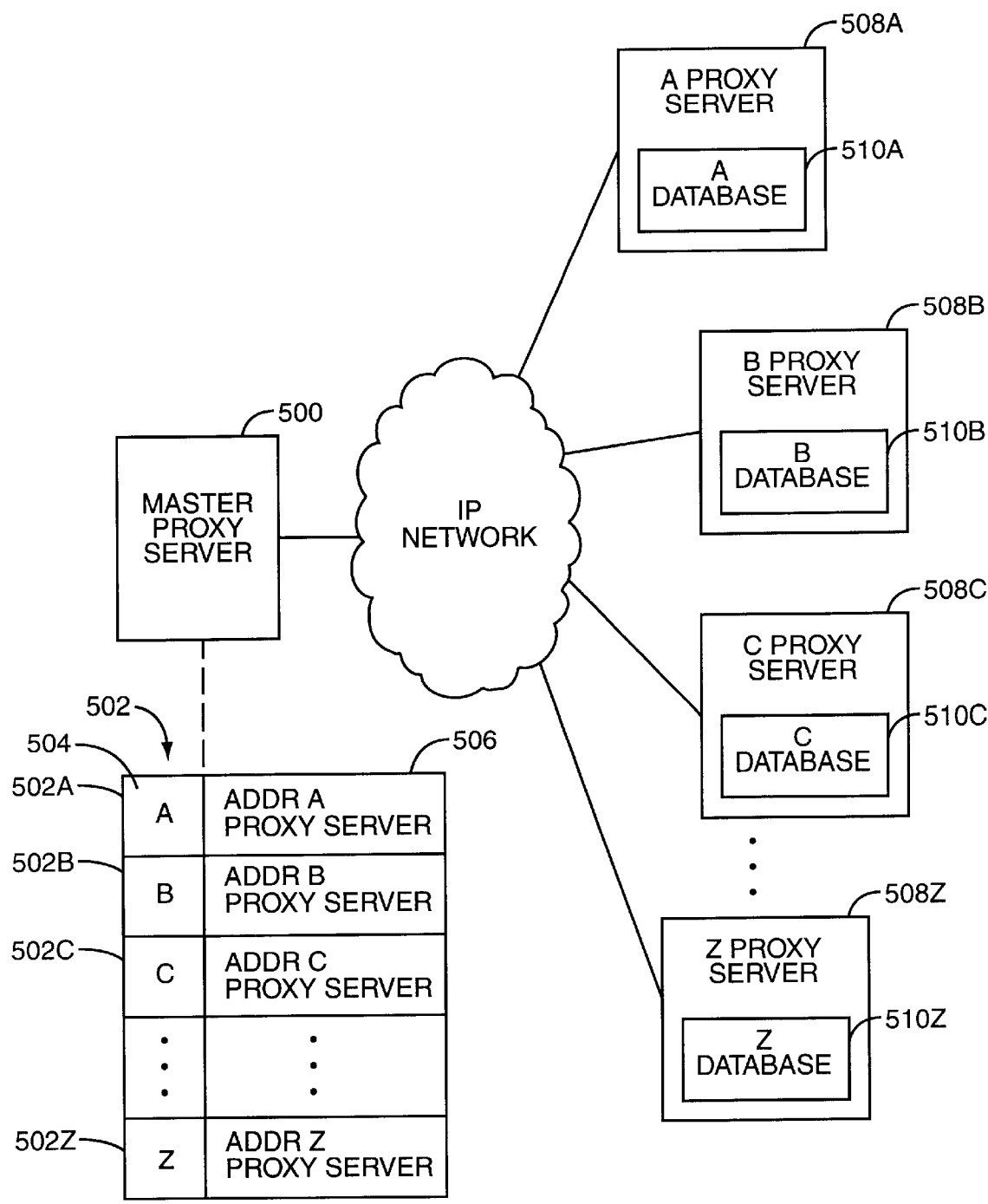
FIG. 5 illustrates an example of a system for implementing a real-time, distributed, hierarchical database according to yet another embodiment of the present invention.

FIG. 5 illustrates an arbitrary database structure that can be implemented by proxy servers according to an embodiment of the present invention. In the illustrated embodiment, master proxy server 500 receives requests for information from a database. In the illustrated embodiment, master proxy server 500 contains a database generally designated 502 in which each record is indexed by a letter of the alphabet. In the illustrated example, database 502 includes records 502A–502Z. Each record 502A–502Z includes a key field 504 containing a letter of the alphabet. Each record 502*a*–502*z* also includes a data field 506 containing the address of a proxy server to which the second level of the database hierarchy is implemented. For example, record 502A includes the letter "A" in key field 504. Data field 506 includes the address of A proxy server 508A. The remaining fields in database 502 contain letters B–Z in key fields 504 and the addresses of the appropriate proxy server in data fields 506, respectively. Proxy servers 508A–508Z each include a database 510A–510Z, respectively. The databases 510A–510Z provide the second level of data for the given database hierarchy.

In operation, when proxy server 500 receives an INVITE message, the message can request a database record corresponding to the text string "C1234". Proxy server 500 accesses database 502 and locates record 502C based on the first letter in the text string. Record 502C includes the address of C proxy server 508C. Accordingly, proxy server 500 formulates an INVITE message and transmits the INVITE message to C proxy server 508C. The INVITE message can include the same text string as the first INVITE message. The INVITE message preferably also includes response routing information indicating that responses should be sent to proxy server 500. When C proxy server 508C receives the INVITE message, C proxy server performs a lookup in C database 510C using the digits "1234". If C proxy server 508C locates a record in C database 510C containing the desired information, C proxy server 508C preferably sends a response to proxy server 500 containing the desired information. Proxy server 500 can then send the information to the requesting entity in the appropriate protocol.

If C database 510C does not contain the data for responding to the request, C proxy server 508C can proxy the request from proxy server 500 and query another database at another hierarchical level (not shown). The request preferably includes response routing information that indicates that responses should be sent to C proxy server 508C. Thus, as illustrated in FIG. 5, the methods and systems for implementing a real-time, distributed, hierarchical database according to embodiments of the present invention can be extended to arbitrarily complex data structures.

Response Timer

As stated above, embodiments of the present invention are preferably capable of implementing a real-time, distributed, hierarchical database in which the number of levels in the hierarchy is transparent to the database user. One aspect of transparency is that the database user receives a response from the entity from which data was requested. This aspect is enabled by the proxying capabilities of the underlying protocol. Another aspect of transparency is timing. For example, if the first proxy server is unable to obtain a response from additional proxy servers in the hierarchical chain, the first proxy server preferably sends a default response to the database user that is within a time period specified by the database user. For example, the TCAP protocol provides a maximum response time for TCAP messages. Accordingly, when master proxy server 500 illustrated in FIG. 5 receives an INVITE message based on a TCAP query, master proxy server 500 preferably starts a timer and takes appropriate action to ensure that a response is sent to the message within the time period.

Figure 6:
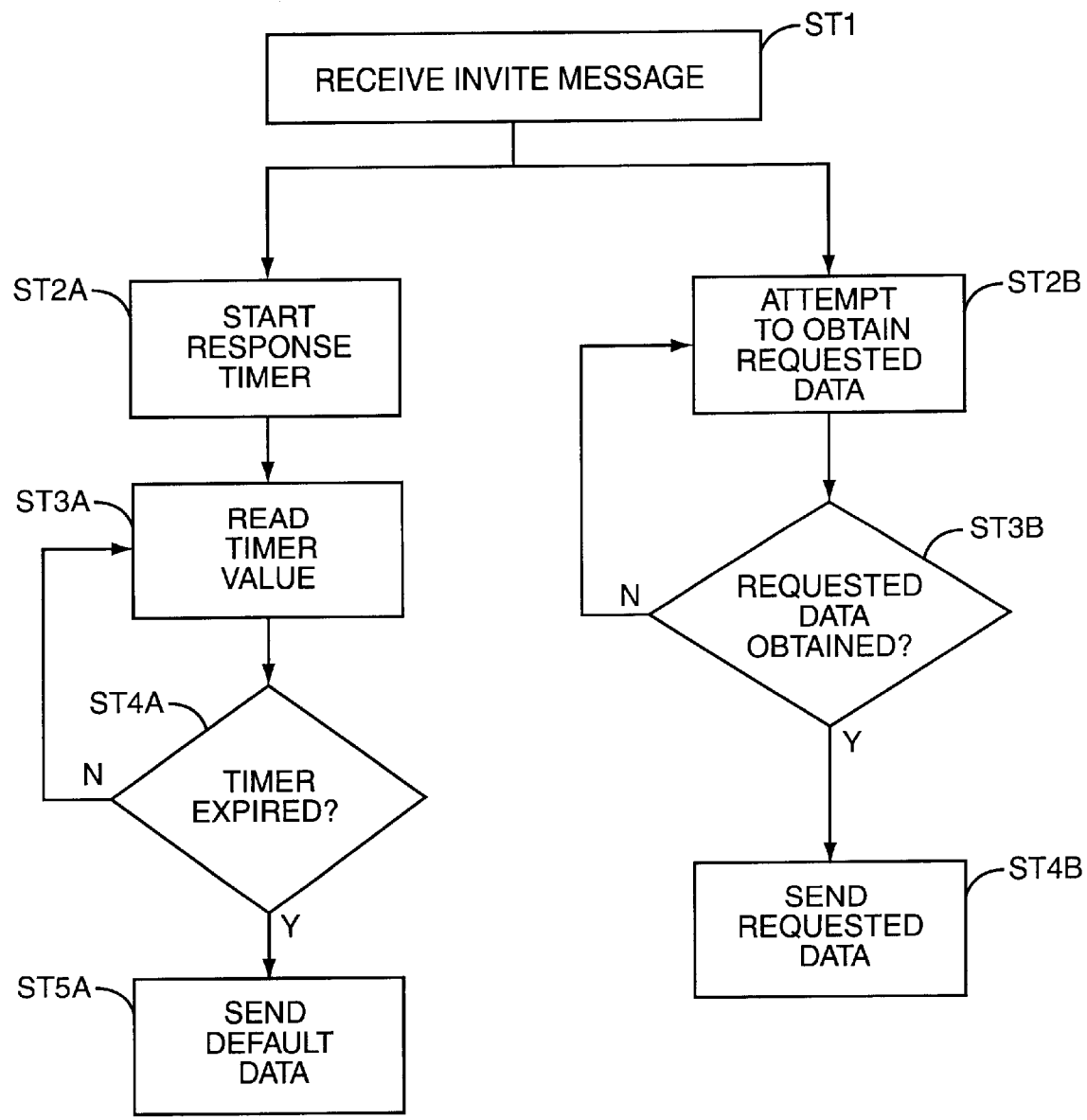
FIG. 6 is a flow chart illustrating exemplary steps that can be performed by a proxy server in providing a default response to an INVITE message according to an embodiment of the present invention.

FIG. 6 is a flow chart illustrating exemplary steps that can be performed by master proxy server 500 in implementing a response timer according to an embodiment of the present invention. In step ST1, master proxy server 500 receives an INVITE message from a database user. For example, the database user can be an SS7/IP gateway, as illustrated and described with respect to FIG. 2. In step ST2A, in response to receiving the message, master proxy server 500 starts a response timer. The response timer can be set to a value that is less than the permissible time period for responding to the request received in step ST1. For example, the response timer can be set to 50% of the maximum time period for responding to the message. In step ST3A, master proxy server 500 reads the timer. In step ST4A, proxy server 500 determines whether the timer has expired. If the timer has not expired, proxy server 500 can continue to check whether the time has expired by repeating steps ST3A and ST4A.

Simultaneously with starting the response timer, in step ST2B, proxy server 500 can attempt to obtain the requested data. Attempting to obtain the requested data can include accessing a local database and/or sending a message to another proxy server. In step ST3B, proxy server 500 determines whether the requested data has been obtained. If the requested data has been obtained in step ST4C, proxy server 500 sends the requested data to the database user. In step ST3B, if the requested data has not been obtained, proxy server 500 continues to attempt to obtain the requested data. Steps ST2B and ST3B can be repeated until the timer expires.

Referring again to step ST4A, if proxy server 500 determines that the time has expired, proxy server 500 preferably sends default data to the database user (step ST5A). The default data can include all of the data obtained up until the timer expired to the database user. For example, proxy server 500 can perform a lookup in its local database, and then request information from another proxy server in the hierarchy. If the timer expires before a reply is received to the request, proxy server 500 preferably sends the results of the first database lookup to the database user. The results from the local database lookup can be a default response for the query or an indication of failure. Thus, proxy server 500 provides real-time responses to database users, even when one or more of the proxy servers that implement the distributed database failed.

One example of when it can be desirable to provide a default response relates to number portability. For example, an end user might desire to have calls to his or her home number forwarded to a mobile phone. In this case, the user's mobile phone number can be stored in the contact field of a number portability database, for example, as illustrated in FIG. 4. The contact information can be modified by an end user via a web browser. Thus, a first level number portability database for the end user might contain the user's home number in the default contact number field, but indicate that a request should be proxied. A second level number portability database can contain the user's mobile phone number in the contact number field, as dynamically configured by the end user. When a query arrives at the first level database, the first level database proxies the query to the second level database. If the proxy server managing the first database does not receive a response before the timer expires, the proxy server can supply the user's home number as a default response.

It will be understood that various details of the invention can be changed without departing from the scope of the invention. Furthermore, the foregoing description is for the purpose of illustration only, and not for the purpose of limitation—the invention being defined by the claims.

What is claimed is:

1. A system for implementing a real-time, distributed, hierarchical database using a proxiable protocol, the system comprising:

(a) a first proxy server for receiving, from a first network element, a first proxiable protocol message including first response routing information for routing a response to the first message to the first network element, performing a first database lookup based on information contained in the first message, formulating a second proxiable protocol message including second response routing information for routing a response to second message to the first proxy server based on results from the first database lookup, and sending the second message over a network; and (b) a second proxy server for receiving the second message, and, in response, performing a second database lookup based on information contained in the second message, formulating a third proxiable protocol message including the first and second response routing information based on results from the second database lookup, and sending the third message to the first proxy server based on the second response routing information.

2. The system of claim 1 wherein the first proxy server receives the third message, and, in response, transmits a fourth proxiable protocol message to the first network element based on the first response routing information.

3. The system of claim 2 wherein the first, second, third, and fourth messages are session initiation protocol (SIP) messages.

4. The system of claim 3 wherein the first and second messages are SIP INVITE messages and the third and fourth messages are SIP MOVED messages.

5. The system of claim 3 wherein the first response routing information includes a first via header including an address of the first network element and the second response routing information includes a second via header including an address of the first proxy server.

6. The system of claim 1 wherein the first proxy and second proxy servers are session initiation protocol (SIP) proxy servers.

7. The system of claim 1 wherein the first proxy server includes a timer, and, in response to failing to receive the third message from the second proxy server before the timer expires, the first proxy server formulates a fourth proxiable protocol message and forwards the fourth message to the first network element.

8. The system of claim 7 wherein the fourth message includes the results from the first database lookup.

9. The system of claim 1 wherein the first message contains a called party number, the first proxy server is adapted to perform the first database lookup using the called party number as a key to determine location information for the second proxy server, and the second proxy server is adapted to perform the second database lookup using the called party number to determine a contact number corresponding to the called party number.

10. A method for using a proxiable protocol to implement a real-time, distributed, hierarchical database, the method comprising:

at a first proxy server, (a) receiving, from a first network element, a first proxiable protocol message including first response routing information for routing responses to the first message to the first network element;

(b) performing a first database lookup based on information contained in the first message;

(c) formulating a second proxiable protocol message based on results from the first database lookup;

(d) adding second response routing information to the second message for routing responses to the second message to the first proxy server;

(e) sending the second message to a second proxy server;

at the second proxy server, (f) receiving the second message, and, in response, performing a second database lookup based on information contained in the second message;

(g) formulating a third proxiable protocol message based on results from the second database lookup, the third message including the first and second response routing information; and (h) transmitting the third message to the first proxy server based on the second response information.

11. The method of claim 10, comprising, at the first proxy server, receiving the third message, and, in response, transmitting, to the first network element, a fourth proxiable protocol message based on the first response routing information.

12. The method of claim 11 wherein formulating the first, second, third, and fourth messages includes formulating session initiation protocol (SIP) messages.

13. The method of claim 12 wherein formulating the first and second messages includes formulating SIP INVITE messages and formulating the third and fourth messages included formulating SIP MOVED messages.

14. The method of claim 12 wherein the first response routing information includes a first via header having an address for the first network element and the second response routing information includes a second via header having an address for the first proxy server.

15. The method of claim 10 wherein receiving the first message at a first proxy server includes receiving the first message at a session initiation protocol (SIP) proxy server.

16. The method of claim 10 wherein receiving the second message includes receiving the second message at a session initiation protocol (SIP) proxy server.

17. The method of claim 10 comprising, at the first proxy server, in response to sending the second message, starting a timer, and, in response to failing to receive the third message from the second proxy server before the timer expires, formulating a fourth proxiable protocol message and forwarding the fourth message to the first network element.

18. The method of claim 17 wherein formulating the fourth message includes placing the results from the first database lookup in the fourth message.

19. The method of claim 10 wherein the first message contains a called party number, performing the first database lookup includes performing the first database lookup using the called party number to determine location information for the second proxy server, and performing the second database lookup includes performing the second database lookup using the called party number.

20. The method of claim 19 wherein the called party number is a ported number and the results from the second database lookup include a contact number corresponding to the ported number.

21. A computer program product comprising computer-executable instructions embodied in a computer-executable medium for performing steps comprising:

(a) at a first proxy server, receiving, from a first network element, a first proxiable protocol message including first response routing information for routing responses to the first message to the first network element;

(b) performing a first database lookup based on information contained in the first message;

(c) formulating a second proxiable protocol message based on results from the first database lookup;

(d) adding second response routing information to the second message for routing responses to the second message to the first proxy server;

(e) receiving a response to the second message, the response including the first and second response routing information; and (f) forwarding the response to the first network element based on the first response routing information.

22. The computer program product of claim 21 wherein receiving the first message includes receiving a first session initiation protocol (SIP) message and formulating the second message includes formulating a second SIP message.

23. The computer program product of claim 22 wherein the first response routing information includes an address for the first network element and the second response routing information includes an address for the first proxy server.

* * * * *